(12) United States Patent
Evans et al.

(10) Patent No.: US 6,903,330 B2
(45) Date of Patent: Jun. 7, 2005

(54) MULTI-POINT SUBSURFACE MEASUREMENT CALIBRATION

(75) Inventors: Michael L. Evans, Missouri City, TX (US); Luca Ortenzi, Stavanger (NO); Richard J. Radtke, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 213 days.

(21) Appl. No.: 10/065,303

(22) Filed: Oct. 1, 2002

(65) Prior Publication Data

US 2003/0080288 A1 May 1, 2003

Related U.S. Application Data

(60) Provisional application No. 60/345,615, filed on Oct. 19, 2001.

(51) Int. Cl.$^7$ .............................................. G01D 18/00
(52) U.S. Cl. .............................. 250/252.1; 250/269.1; 250/269.4; 250/269.3
(58) Field of Search .......................... 250/252.1, 269.1, 250/269.3, 269.4, 261, 262; 702/8, 85, 104

(56) References Cited

U.S. PATENT DOCUMENTS

| | | | |
|---|---|---|---|
| 2,816,235 A | | 12/1957 | Scherbatskoy |
| 3,435,215 A | | 3/1969 | Prichett |
| 3,860,816 A | | 1/1975 | Wilson |
| 3,922,541 A | * | 11/1975 | Seeman ..................... 250/256 |
| 4,085,323 A | | 4/1978 | Turcotte et al. |
| 4,791,656 A | * | 12/1988 | Pratt et al. .................... 378/89 |
| 4,945,233 A | | 7/1990 | Jorro |
| 5,459,314 A | | 10/1995 | Plasek |
| 5,530,243 A | * | 6/1996 | Mathis ..................... 250/269.3 |
| 5,684,299 A | * | 11/1997 | DasGupta ................ 250/269.2 |
| 5,699,246 A | | 12/1997 | Plasek |
| 5,708,203 A | * | 1/1998 | McKinley et al. ........ 73/152.14 |
| 6,050,725 A | * | 4/2000 | Regimand ................... 378/207 |
| 6,289,283 B1 | | 9/2001 | Plasek |
| 6,369,381 B1 | * | 4/2002 | Troxler et al. ........... 250/252.1 |
| 6,389,367 B1 | | 5/2002 | Plasek |

OTHER PUBLICATIONS

Search Report from GB 0222688.4 dated Jun. 10, 2003.

* cited by examiner

*Primary Examiner*—Albert Gagliardi
(74) *Attorney, Agent, or Firm*—Victor H. Segura; Brigitte L. Echols

(57) ABSTRACT

Techniques for calibrating well-logging sensors comprising emitting a first signal into a first calibration substance disposed proximate to the sensor, measuring a first sensor response from the first signal, emitting a second signal into a second calibration substance disposed proximate to the sensor, measuring a second sensor response from the second signal, and determining a sensor response function from the first sensor response and the second sensor response. One embodiment includes providing a well-logging sensor having a known response function, determining an expected range of a quality check response of the sensor using a quality-check substance with known properties, emitting a quality check signal into the quality-check substance, measuring the quality check response from the quality check signal, and comparing the expected range with the quality check response.

11 Claims, 6 Drawing Sheets

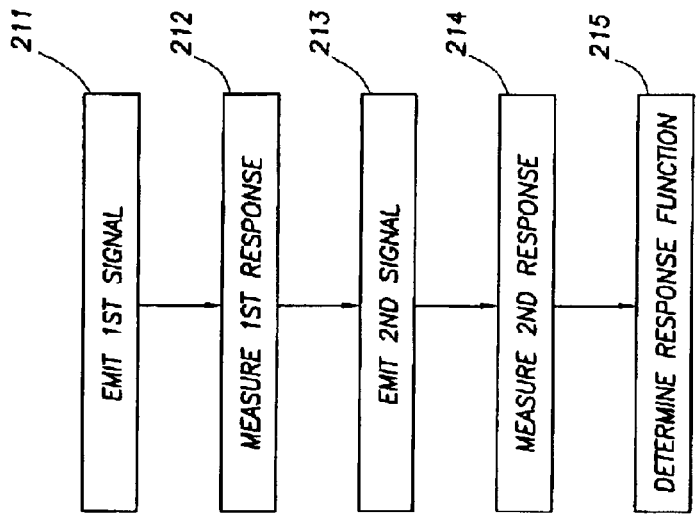
FIG. 2A
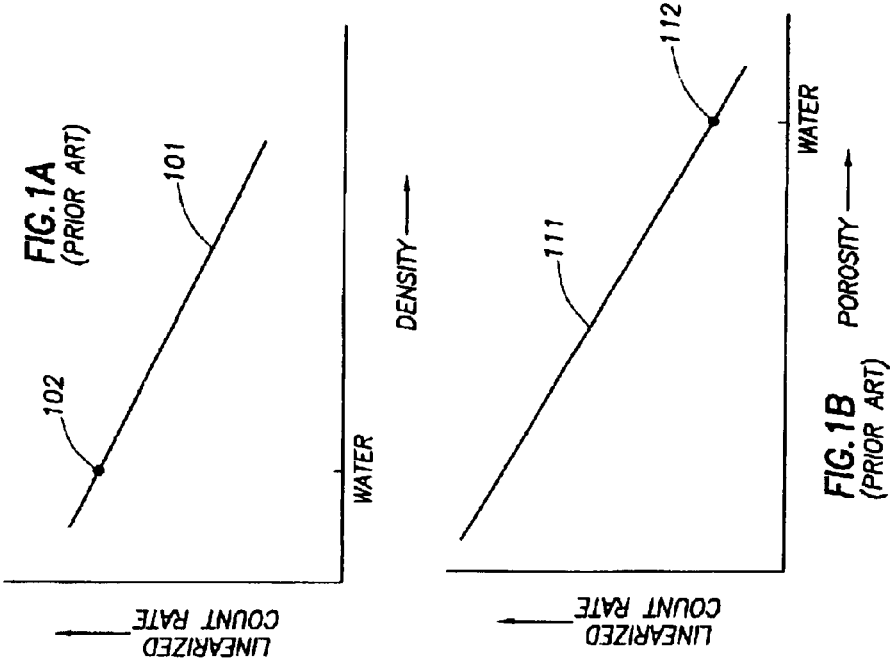
FIG. 1A (PRIOR ART)
FIG. 1B (PRIOR ART)

MULTI-POINT SUBSURFACE MEASUREMENT CALIBRATION

CROSS REFERENCE TO RELATED APPLICATIONS

This application claims the benefit of U.S. Provisional Patent Application 60/345,615, filed on Oct. 19, 2001.

BACKGROUND OF INVENTION

The invention relates generally to calibration of sensors. More specifically, the invention relates to an improved method for calibrating sensors adapted for measurement of subsurface properties.

In the oil-drilling and exploration industry, many types of sensors are used to evaluate subsurface formations traversed by a borehole, commonly referred to as well logging. Sensors measure a phenomenon that is related to a physical property of the formation, such as the density or the porosity. A particular formation property can be determined by measuring a phenomenon related to the formation property and calculating the formation property based on the relationship between the measured phenomenon and the desired formation property. In order to obtain useful information about the formation property, it is necessary to calibrate the sensor.

Calibration normalizes a raw measurement to a known reference. A sensor is used to measure a substance with known properties. The calibration measurement made by the sensor can be correlated to the known properties of the substance. This determines the relationship between the raw sensor measurement and the physical property.

One example of a sensor used in well logging is a density sensor. One type of density sensor uses a radioactive source to emit gamma rays into a formation. Some of the emitted gamma rays interact with electrons in the formation, and, through a process called Compton Scattering, are scattered back into the borehole. The density sensor includes detectors that detect gamma rays scattered back into the borehole. The number of gamma rays that scatter back into the borehole is related to the number of electrons in the formation, and the number of electrons in the formation is related to the density of the formation. Thus, the number of detected gamma rays, called the count rate, is related to the density of the formation.

Calibration is required because the number of detected gamma rays depends on more factors than the density of the formation. The count rate also depends heavily on the strength of the source and the sensor geometry. For example, it is expected that by doubling the activity of the source, i.e. changing to a source that emits twice as many gamma rays, the count rate would also double. Further, the sensor efficiency at detecting gamma rays affects the count rate. This efficiency varies from sensor to sensor. By calibrating a density sensor, the density of a formation can be precisely determined based on the count rate measured by the sensor.

Typical calibration methods are performed on a sensor before it is disposed within a borehole. Often times, these calibration methods are performed in a controlled environment away from the well site. One common method of calibrating a density sensor includes placing the sensor in water, inserting a source into the sensor, and measuring the count rate of back-scattered gamma rays. The count rate made with the sensor in water is correlated to the density of water, and the slope of the response function is assumed. This method is known in the art as a "one-point method", because a calibration line is determined based on a single point.

FIG. 1A shows a plot of a prior art response function 101 for a density sensor with a water calibration point 102. Typical calibration methods assume the density sensor has a linear response with a known slope. With the water calibration point and an assumed slope, a sensor response function, plotted at 101, can be determined as the line with the assumed slope that intersects the water calibration point 102.

Another sensor used in well logging is a neutron sensor. A neutron sensor uses a source that emits "fast", or high energy, neutrons into a formation. The neutrons lose energy through collisions with the atoms in the formation, becoming "thermal" or "epi-thermal" neutrons. The neutron sensor detects these neutrons that migrate back into the borehole.

The fast neutrons slow down by colliding with atoms in the formation. Hydrogen, because it has a mass similar to that of a neutron, provides much more rapid slowing of the neutrons than other atoms. Thus, the number of thermal neutrons detected in a borehole is related to the number of hydrogen atoms in the formation. Because water and hydrocarbons have similar concentrations of hydrogen (hydrogen indices), and because the rock matrix of the formation is relatively free of hydrogen, the number of thermal neutrons in the borehole is related to the amount of hydrocarbons and water in the formation. In a non-gas bearing formation, the volume fraction of water and hydrocarbons is called the porosity.

Calibration of a neutron sensor determines how the thermal neutron count rate is related to the formation porosity. One conventional method includes surrounding the neutron sensor with water and making a calibration measurement. In this type of calibration, the porosity of water is set at one.

FIG. 1B shows a prior art neutron calibration with water. The sensor is assumed to have a linear response with a known slope, and the measurement of the count rate at the water point 112 yields a response function, plotted at 111, that intersects the water point 112.

SUMMARY OF INVENTION

One aspect of the invention provides a method for calibrating a well-logging sensor by emitting a first signal into a first calibration substance disposed proximate to the sensor, measuring a first sensor response, emitting a second signal into a second calibration substance disposed proximate to the sensor, measuring a second sensor response, and determining a sensor response function from the first sensor response and the second sensor response.

Another aspect of the invention provides a method for calibrating a well-logging sensor comprising emitting a first signal into a first calibration substance disposed proximate to the sensor, measuring a first sensor response, emitting a second signal into a second calibration substance disposed proximate to the sensor, measuring a second sensor response, emitting a third signal into a third calibration substance, measuring a third sensor response, and determining a sensor response function from the first sensor response, the second sensor response, and the third sensor response.

Still another aspect of the invention provides a method for calibrating a well-logging sensor comprising providing a well-logging sensor having a known response function, determining an expected range of a quality check response of the sensor using a quality check-substance with known properties, and emitting a quality check signal into the quality-check substance disposed proximate to the sensor, measuring the quality check response from the quality check signal, and comparing the expected range with the quality check response.

Yet another aspect of the invention provides a method of calibrating a well-logging density sensor comprising emitting a first gamma ray signal into an aluminum alloy block disposed proximate to the sensor, measuring a first density sensor response from the first gamma ray signal, emitting a second gamma ray signal into a magnesium alloy block disposed proximate to the sensor, measuring a second density sensor response from the second gamma ray signal, and determining a density sensor response function from the first density sensor response and the second density response.

Still yet another aspect of the invention provides a method of calibrating a well-logging density sensor comprising emitting a first gamma ray signal into an aluminum alloy block disposed proximate to the sensor, measuring a first density sensor response from the first gamma ray signal, emitting a second gamma ray signal into a magnesium alloy block disposed proximate to the sensor, measuring a second density sensor response from the second gamma ray signal, emitting a third gamma ray signal into water disposed proximate to the sensor, measuring a third density sensor response from the third gamma ray signal, and determining a density sensor response function from the first density sensor response, the second density sensor response, and the third density response. In some embodiments, the method includes determining an expected range for a quality check response using water as a quality-check substance, emitting a quality check gamma ray signal into water disposed proximate to the sensor, measuring the quality check sensor response from the quality check gamma ray signal, and comparing the expected range of the quality check response with the quality check response.

Another aspect of the invention provides a method of calibrating a well-logging neutron sensor comprising emitting a first neutron signal with air disposed in a channel within the sensor, measuring a first neutron response from the first neutron signal, emitting a second neutron signal with a polymer rod disposed in the sensor channel, measuring a second neutron sensor response from the second neutron signal, and determining a neutron sensor response function from the first neutron sensor response and the second neutron sensor response. In some embodiments, the method includes determining an expected range for a quality check response using water as a quality-check substance, emitting a quality check neutron signal with water disposed in the sensor channel, measuring the quality check response from the quality check neutron signal, and comparing the expected range of the quality check response with the quality check response.

Another aspect of the invention provide a method of calibrating a well-logging neutron sensor comprising emitting a first neutron signal with air disposed in a channel within sensor, measuring a first neutron response from the first neutron signal, emitting a second neutron signal with a polymer rod disposed in the sensor channel, measuring a second neutron sensor response from the second neutron signal, emitting a third neutron signal with water disposed in the sensor channel, measuring a third neutron sensor response based on the third neutron signal, and determining a neutron sensor response function from the first neutron sensor response, the second neutron sensor response, and the third neutron sensor response.

Yet another aspect of the invention provides a method of calibrating a well-logging sensor comprising emitting a signal into each of at least two calibration substances disposed proximate to the sensor, measuring at least two sensor responses, each sensor response respectively corresponding to the signal emitted into each of the disposed calibration substances, and determining a sensor response function from the at least two sensor responses.

Other aspects and advantages of the invention will be apparent from the following description and the appended claims.

BRIEF DESCRIPTION OF DRAWINGS

FIG. 1A shows a plot of a prior art density sensor response function.

FIG. 1B shows a plot of a prior art neutron sensor response function.

FIG. 2A shows a flow chart of a two-point method according to one embodiment the invention.

DETAILED DESCRIPTION

Figure 3A:
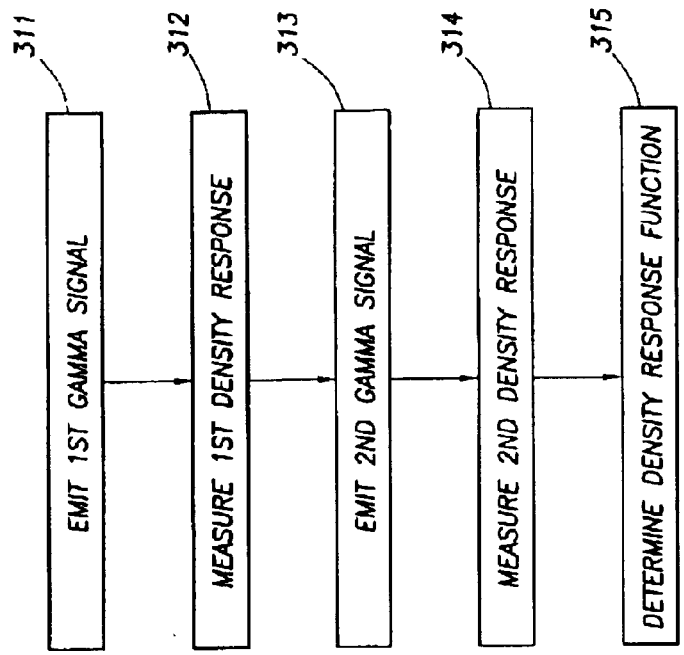
FIG. 3A shows a flow chart of a two-point method for calibrating a density sensor according to one embodiment of the invention.

Techniques for calibrating subsurface measurement sensors are presented. A method according to the invention relates to a two-point calibration. Another method according to the invention relates to a quality-check for a calibration.

FIG. 2A shows one aspect of a method of calibrating a sensor according to the invention. The method according to this embodiment includes emitting a first signal into a first calibration substance 211 and measuring a first sensor response from the first signal 212. A sensor response is the count rate measurement made by the sensor with a particular substance having a known property disposed proximate to the sensor. A sensor response determines a raw count rate that correlates to a known physical property. The method next includes emitting a second signal into a second calibration substance 213 and measuring a second sensor response with the second calibration substance 214. The method then includes determining a response function based on the first and second sensor responses 215.

Figure 2B:
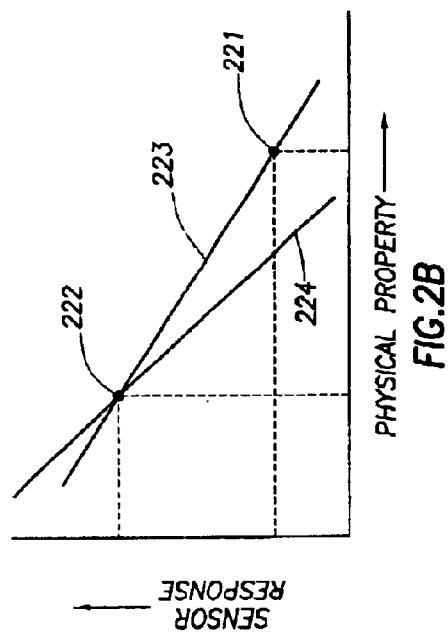
FIG. 2B shows a plot of a response function according to one embodiment of the invention.

The first and second sensor responses provide two points that enable the determination of a linear response function without having to assume a slope. FIG. 2B shows a plot of a response function 223 that is determined from a first sensor response 221 and a second sensor response 222. The response function plot 223 is a line through the first 221 and second 222 sensor response points.

In this disclosure, the first signal describes a signal emitted into a first calibration substance, and the second signal describes a signal emitted into a second calibration substance. Those skilled in the art will appreciate that many sensors use radioactive sources that continuously emit radiation. The designation of first and second signals does not denote any difference between the signals, other than the substance into which the signal is emitted. Those having skill in the art will also appreciate that some sensors have pulsed sources that can be energized only when a measurement is being made. In some embodiments, the first and second signals using a pulsed source are substantially identical. The first and second calibration substances can be any substance where the property to be measured by the sensor is known. It is desirable for the measured property of the calibration substances to be substantially different so as to enable a more accurate determination of a response function.

Many sensors have non-linear responses to changes in formation properties. For ease of computation, count rates in some sensors, for example, density and neutron sensors, are "linearized." A linearized count rate is a function of the actual count rate which yields a line when plotted against the physical property measured by the sensor. In one embodiment, this function is the logarithm of the actual count rate. By using logarithms, exponential variations can be graphed as straight lines.

In many logging applications, it is not possible to determine a formation property based on data from a single sensor. Instead, complex algorithms are used to interpret data from a plurality of well-logging sensors to determine formation properties. Under these circumstances, raw data from a well-logging sensor can be calibrated to a known reference. Calibration removes the differences between sensors of the same type, such that the same set of algorithms can be used to interpret well-logging sensor data. By calibrating sensors to be used with algorithms, formation properties can be determined based on the count rate independent of the sensor used.

Using a two-point calibration method, a linear transformation can be used to accomplish the transformation:

$$CR_{ref} = \alpha + \beta CR_{raw}, \quad (1)$$

where $\alpha$ and $\beta$ are defined by:

$$\beta = \frac{CR2_{ref} - CR1_{ref}}{CR2 - CR1} \quad (2)$$

$$\alpha = CR1_{ref} - \beta CR1, \quad (3)$$

and $CR_{cal}$=calibrated linearized count rate
$CR_{raw}$=uncalibrated linearized count rate
$CR1_{ref}$=reference linearized count rate for the first calibration substance
$CR2_{ref}$=reference linearized count rate for the second calibration substance
CR1=linearized count rate for the first calibration substance
CR1=linearized count rate for the second calibration substance.

The reference linearized count rates for the first and second calibration substances $CR1_{ref}$, $CR2_{ref}$ represent count rates for the calibration substances based on a reference sensor.

In this disclosure, "response function" denotes either a function that relates a count rate to a physical property or a function that relates a raw count rate to a reference count rate for data analysis, as in Equation 1. Calibration of a sensor can be accomplished with either of these functions.

The linearized count rate of a sensor can vary due to several factors. Among these are source strength, sensor geometry, and changes in the sensor over time. Reference numeral 224 in FIG. 2B demonstrates the advantages of a two-point calibration method over the prior art methods. If only one sensor response measurement, for example, point 222 in FIG. 2B, is used to calibrate a sensor, the resulting assumed response function is be represented by a line 224 with an assumed slope through the single sensor response 222. If the actual sensor response function does not have the assumed slope, the assumed response function will be inaccurate.

Advantageously, a two-point calibration method according to one aspect of the invention accounts for the slope of a sensor response function. A two-point calibration method determines the sensor response function that applies at the time the sensor is calibrated.

FIG. 3A shows an embodiment of a method according to the invention. A two-point calibration is used to calibrate a density sensor. The method includes emitting a first gamma ray signal into a first calibration substance disposed proximate to the density sensor 311, measuring a first density sensor response from the first gamma ray signal 312, emitting a second gamma ray signal into a second calibration substance disposed proximate to the density sensor 313, measuring a second density sensor response from the second gamma ray signal 314, and determining a density sensor response function 315.

The first density sensor response is measured using a first calibration substance. The first calibration substance can be any substance with a known density. One example is water, which has a density of about 1.0 g/cm³. Preferably, the first calibration substance has a density in the range of measurement usually encountered in a borehole. For well-logging applications, the typical density range is between 1.5 g/cm³ and 3.1 g/cm³. Calibration substances are typically metal blocks. Examples of preferred calibration substances with a density in this range include aluminum alloys (2.6 g/cm³) and magnesium alloys (1.7 g/cm³). Aluminum alloys and magnesium alloys provide excellent calibration substances because they each have a density in the typical range, they are relatively easy to form and machine, and they are inexpensive.

The second calibration substance, like the first calibration substance, should be a substance with a known density, preferably within an expected range. It is also desirable to use a second calibration substance with a density that is different from the density of the first calibration substance. Thus, if an aluminum alloy is used for the first calibration substance, a magnesium alloy could be used for the second calibration substance.

Figure 3B:
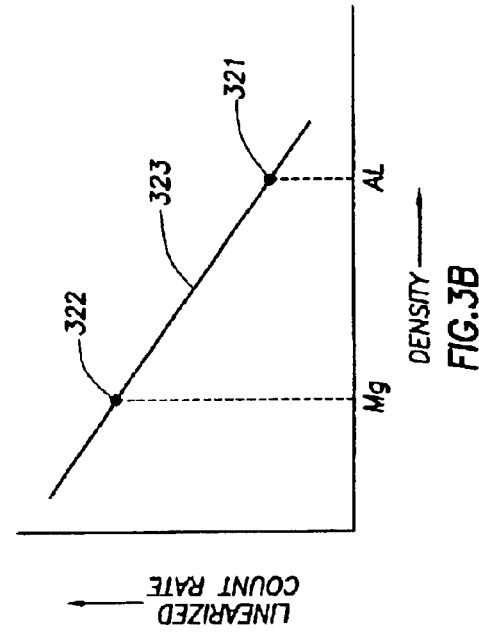
FIG. 3B shows a plot of a density sensor response function according to one embodiment of the invention.

FIG. 3B shows a plot of a density sensor response function 323 based on a two-point calibration. The first density sensor response 321 is measured using an aluminum block as the first calibration substance. The second density sensor response 322 is measured using a magnesium alloy as the second calibration substance. The density sensor response is represented by a line 323 plotted through the first 321 and second 322 density sensor responses.

Those skilled in the art will appreciate that the first and second calibration substances are not limited to aluminum alloys and magnesium alloys. The calibration substances can be any substance, including metals, alloys, and composites, that has a known density. Further, the first and second substances can be reversed without departing from the scope of the invention. The invention is not limited by the calibration substances or the order of measurements.

Figure 4A:
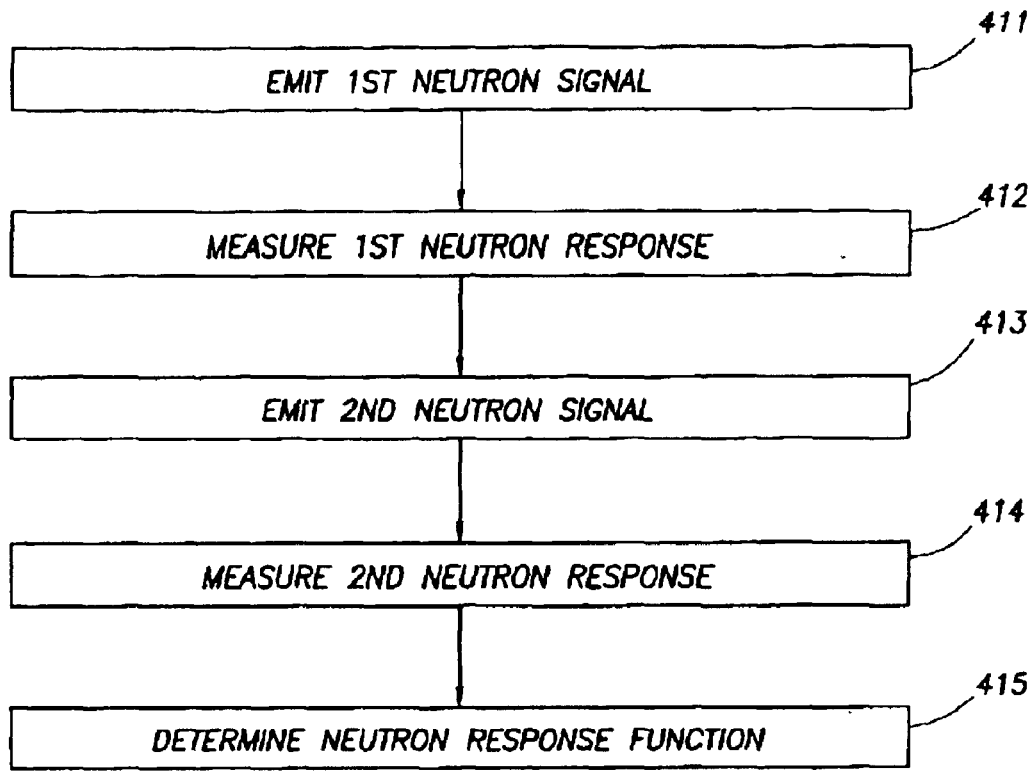
FIG. 4A shows a flow chart of a two-point calibration method for calibrating a neutron sensor according to one embodiment of the invention.

FIG. 4A shows another embodiment of a method according to the invention. A two-point calibration method is used to calibrate a neutron sensor used for while-drilling operations. As known in the art, borehole-drilling operations incorporate a fluid or "mud" that is pumped down through the tools and recovered as it returns to the surface. In this embodiment, the sensor includes a channel to allow for passage of the mud therethrough as known in the art (not shown). The method includes emitting a first neutron signal with air in the sensor mud channel, 411, measuring a first neutron sensor response from the first neutron signal 412, emitting a second neutron signal with a polymer rod disposed in the sensor mud channel 413, measuring a second neutron sensor response from the second neutron signal 414, and determining a neutron sensor response function from the first and second neutron sensor responses 415. Although examples of air and a polymer rod are provided, the calibration substances can be any substance with a known effective porosity. The polymer rod may be a cylindrical rod constructed of aluminum and polyethylene sections, for example. The polyethylene sections introduce hydrogen into the sensor channel for calibration. The amount of polyethylene in the rod may be varied based on the specific needs of the particular neutron sensor and calibration.

The calibration setup presents a different environment compared to the downhole environment. In calibration, a neutron sensor does not measure the actual porosity of a calibration substance. Instead, a neutron sensor being calibrated measures the effect of the calibration substance on the neutrons emitted by a neutron source used in connection with the neutron sensor. This effect of the calibration substance is correlated with the same effect a formation with a particular porosity would have, and that porosity is called the "effective porosity."

Figure 4B:
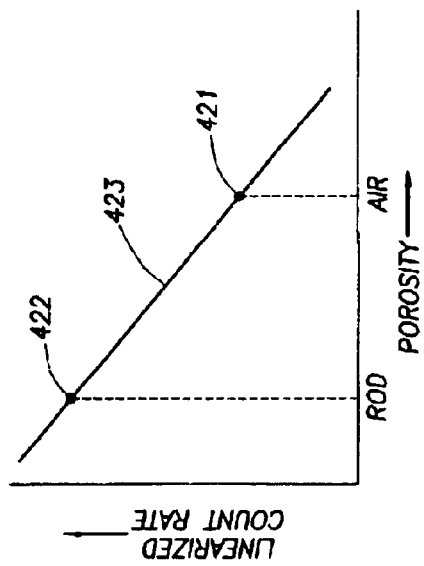
FIG. 4B shows a plot of a neutron sensor response function according to one embodiment of the invention.

FIG. 4B shows a plot of a neutron sensor response function 423 based on a two-point calibration method. The first neutron sensor response 421 is measured with air in the mud channel, and the second neutron sensor response 422 is measured with a polymer rod in the mud channel. The neutron sensor response function is represented by a line 423 plotted through the first 421 and second 422 neutron sensor responses.

Figure 5A:
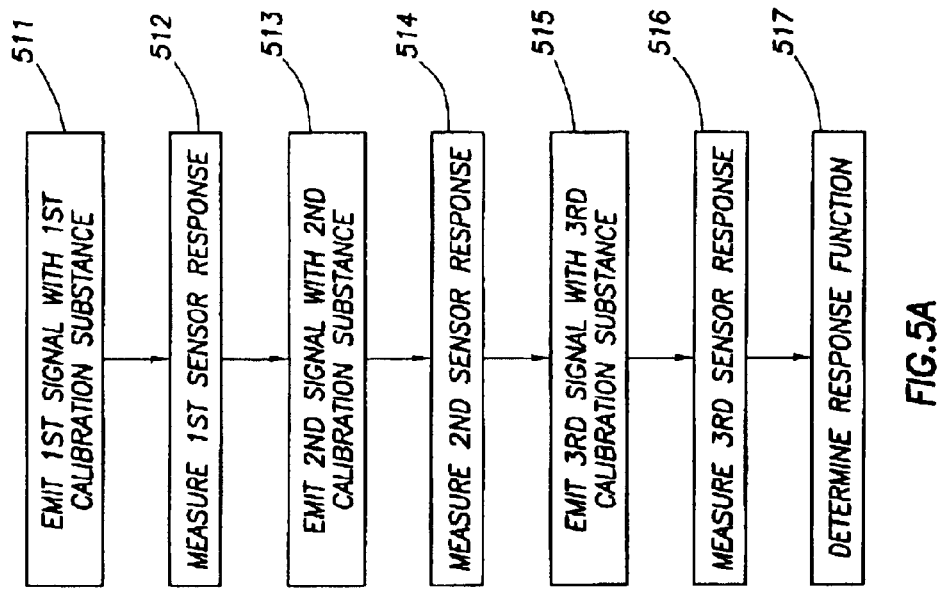
FIG. 5A shows a flow chart of a three-point calibration method according to one embodiment of the invention.

FIG. 5A shows another aspect of a method according to the invention using a three-point calibration method. The method includes emitting a first signal into a first calibration substance disposed proximate to the sensor 511, measuring a first sensor response 512 with the first calibration substance, emitting a second signal into a second calibration substance disposed proximate to the sensor 513, measuring a second sensor response 514 with a second calibration substance, emitting a third signal into a third calibration substance disposed proximate to the sensor 515, measuring a third sensor response 516 with the third calibration substance, and determining a sensor response function from the first, second, and third sensor responses 517.

Advantageously, the third sensor response enables the determination of a curved response function when the count rate cannot be completely linearized. A non-linear response may result from sensor irregularities or wear on the sensor. It may also represent the inherent response of the sensor.

The third calibration substance is any substance with known properties, and is preferably different from the first and the second calibration substances. A technique for determining a sensor response function 517 in one embodiment includes applying a linear least-squares fit to the three sensor responses, thereby determining a linear response function.

When the response function comprises a quadratic transformation to match the sensor count rates to an established reference, the calibrated count rate can be defined by:

$$CR_{ref} = \alpha + \beta CR_{ref} + \gamma CR_{ref} \times CR_{ref}. \quad (4)$$

where $\alpha$, $\beta$, and $\gamma$ are determined from the three calibration measurements by first defining:

$$\delta = \frac{CR3 - CR2}{CR2 - CR1}. \quad (5)$$

Then, $\alpha$, $\beta$, and $\gamma$ are defined by:

$$\gamma = \frac{CR3_{ref} - CR2_{ref} - \delta(CR2_{ref} - CR1_{ref})}{\delta(CR1^2 - CR2^2) + CR3^2 - CR2^2} \quad (6)$$

$$\beta = \frac{CR2_{ref} - CR1_{ref} + \gamma(CR1^2 - CR2^2)}{CR2 - CR1} \quad (7)$$

$$\alpha = CR2_{ref} - \beta CR2^2, \quad (8)$$

where:
 $CR_{cal}$=calibrated linearized count rate
 $CR_{raw}$=uncalibrated linearized count rate
 $CR1_{ref}$=reference linearized count rate for the first calibration substance
 $CR2_{ref}$=reference linearized count rate for the second calibration substance
 $CR3_{ref}$=reference linearized count rate for the third calibration substance
 CR1=linearized count rate for the first calibration substance
 CR2=linearized count rate for the third calibration substance
 CR3=linearized count rate for the third calibration substance.

Figure 5B:
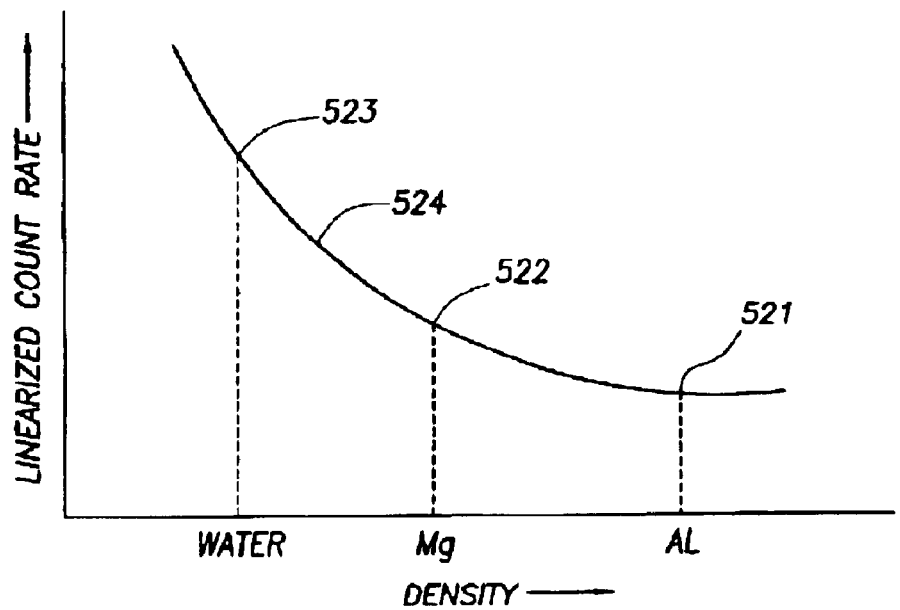
FIG. 5B shows a plot of a density sensor response function determined from three calibration points according to one embodiment of the invention.

FIG. 5B shows a graph of a three-point calibration method applied to a density sensor. The first density sensor response 521 is measured with an aluminum alloy as the first calibration substance, the second density sensor response 522 is measured with a magnesium alloy as the second calibration substance, and the third density sensor response 523 is measured with water as the third calibration substance. The calibration substances and the order of the calibration measurements are presented as an example; the invention is not limited by the particular calibration substances or the order of calibration measurements.

The plot of the density sensor response function 524 is a curve that passes through all three sensor responses 521, 522, 523. The curved density sensor response function 524 is more accurate than a linear response function when the density sensor exhibits a non-linear response.

Figure 5C:
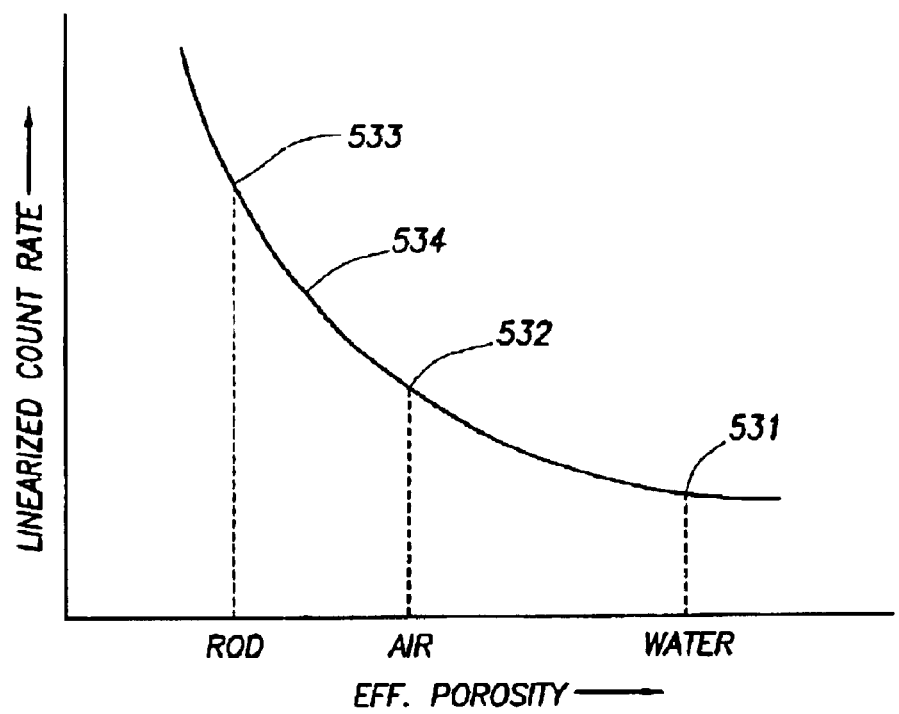
FIG. 5C shows a plot of a neutron sensor response function determined from three calibration points according to one embodiment of the invention.

FIG. 5C shows a graph of a three point calibration method applied to a neutron sensor. The first neutron sensor response 531 is measured with water as the first calibration substance, the second neutron sensor response 532 is measured with a air as the second calibration substance, and the third neutron sensor response 533 is measured with a polymer rod as the third calibration substance. The calibration substances and the order of the calibration measurements are presented as an example; the invention is not limited by the particular calibration substances or the order of calibration measurements.

A typical neutron-sensing instrument has two detectors, a near-spaced detector and a far-spaced detector. The graph in FIG. 5C generally represents the near-spaced neutron detector. Because of the way thermal neutrons diffuse in a formation, the long-spaced detector would have the polymer rod at the second sensor response 532 and air at the third sensor response. The arrangement of the sensor responses is not intended to limit the invention. Those skilled in the art will appreciate the differences in long and short spaced neutron sensor responses.

The neutron sensor response function 534 is a curve that passes through all three sensor responses 531, 532, 533. The curved neutron sensor response function 534 is more accurate than a linear response function when the neutron sensor exhibits a non-linear response. Neutron sensors often exhibit non-linear responses. A three-point calibration method is particularly useful with a neutron sensor, although the method can be applied to any sensor that exhibits a non-linear response.

Figure 6A:
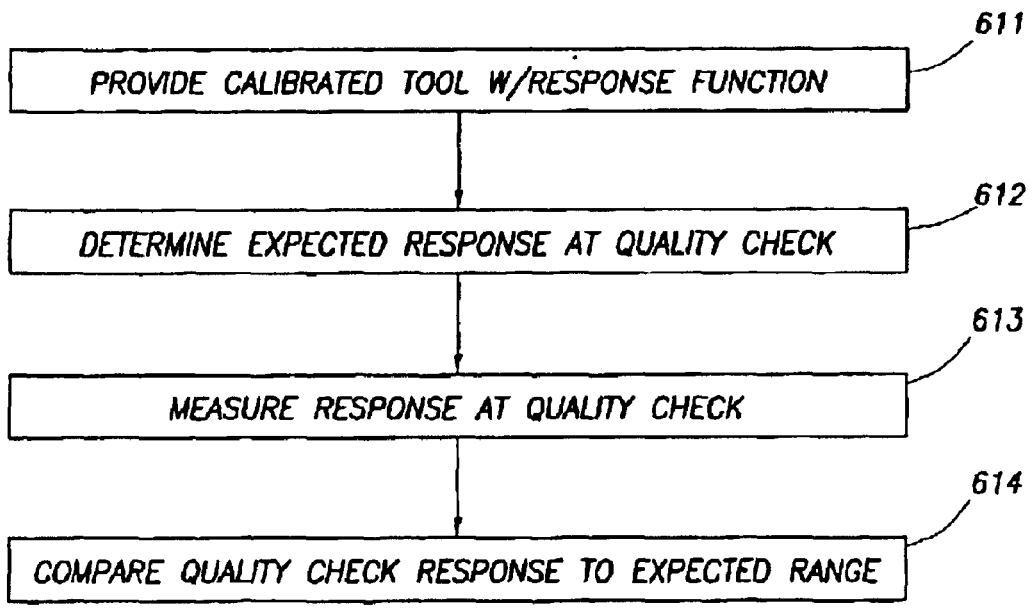
FIG. 6A shows a flow chart of a quality-check method according to one embodiment of the invention.

FIG. 6A shows another aspect of a method according to the invention. A quality-check is applied to a calibrated sensor, thereby verifying the accuracy of the calibration. The method includes providing a sensor having a known response function 611, determining an expected range of a quality check response using a quality-check substance 612, measuring the quality-check response with the quality-check substance disposed proximate to the sensor 613, and comparing the expected range to the quality-check response 614.

First, a sensor having a known response function is provided 611. The sensor may have been calibrated to determine the response function, but it is not necessary that the sensor be calibrated with any of the methods described above. Based on an acceptable margin of error in the sensor determination of the physical property to be measured, the method next includes determining an expected range 612 for the linearized count rate using the quality-check substance. The error margin is selected based on each particular measurement situation.

The method then includes measuring a quality-check response 613. The quality-check response is measured with a quality-check substance disposed proximate to the sensor. The quality-check substance is any substance with known properties. It is preferable that the quality-check substance is different from any substances used to calibrate the sensor.

The method also includes comparing the quality-check response with the expected range 614. If the quality-check response lies in the expected range, the response function is valid. If the quality-check is performed following a calibration, then the calibration is considered a good calibration. If, on the other hand, the quality-check response is not within the expected range, the response function is invalid. If the quality-check is performed following a calibration, the calibration is considered a bad calibration, and the sensor may be recalibrated.

Advantageously, a quality-check according to a method of the invention determines if a calibration is valid. Many factors can cause a calibration to be bad, including sensor malfunction and human errors in the calibration procedure. When a quality-check indicates a bad sensor calibration, the sensor can be recalibrated to correct the error.

Density sensors measure gamma rays that come from a specific direction. Thus, density sensors are particularly sensitive to the position of the calibration and quality-check substances. Any error in locating the calibration substances during calibration will result in a bad calibration.

Neutron sensors measure thermal or epi-thermal neutrons. Any hydrogen disposed proximate to the sensor will thermalize neutrons and affect the sensor response. For example, if any water (or mud) remains in the mud channel when the sensor is calibrated, the hydrogen will affect the calibration measurements, causing the calibration measurements to be inaccurate. Those skilled in the art will appreciate that any neutron moderator near the sensor will have the same effect.

The quality check determines whether the response function is accurate. Any discrepancy between the quality check response and the expected range indicates a possible error in the calibration procedure or in the quality check procedure. Advantageously, if the quality check response agrees with the expected range, there is much greater confidence that the response function is accurate.

Figure 6B:
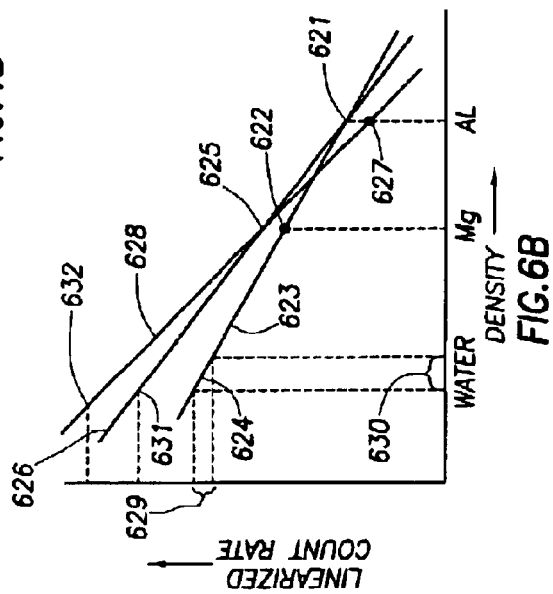
FIG. 6B shows a plot of a density sensor response function and a quality-check point according to one embodiment of the invention.

FIG. 6B demonstrates how the quality check can be applied to a density sensor that is calibrated with a two-point calibration method. A calibration may be performed by measuring the first density sensor response 621 with an aluminum alloy as the first calibration substance and measuring a second density sensor response 622 using a magnesium alloy as the second calibration substance. A density response function, represented by line 623, can be determined from the first 621 and second 622 density sensor responses. An expected range for a quality check response is determined based on the response function and an acceptable error range for the density 630. The quality check response 624, using water as the quality check substance, is then compared to the expected range 629. If the quality check response is within the expected range 629, the calibration is valid.

FIG. 6B also demonstrates the effect of a bad calibration on a response function. For example, if the second density sensor response is too high, for example, at point 625, the resulting erroneous response function could be represented by line 626. A quality check response using water as the quality check substance is expected to be near point 631. A comparison of an actual quality check response, measured near point 624, as it should be in this example, that would indicate a bad calibration.

Further, if both the first and second sensor responses measured during calibration are affected by error, the resulting response equation will also be erroneous. If the first density sensor response was too low, for example at point 627, and the second density response was measured too high at point 625, as in the previous example, the resulting response equation could be represented by line 628. Again, a quality check response at a point other than 632 would reveal an error in the calibration.

Those skilled in the art will be able to devise variations of the disclosed techniques without departing from the scope of the invention. For example, water could be used as the first calibration substance, and aluminum alloy could be used as the quality check substance. Further, the methods are not limited to aluminum alloy and magnesium alloy as the calibration substances. Other suitable substances could be used. Additionally, a method according to the invention is not limited by the order of the quality check. The calibration and quality check measurements could be made at one time and in any order, and the expected range could be determined later. Upon the determination of the expected range, the validity of the calibration can be determined.

Figure 6C:
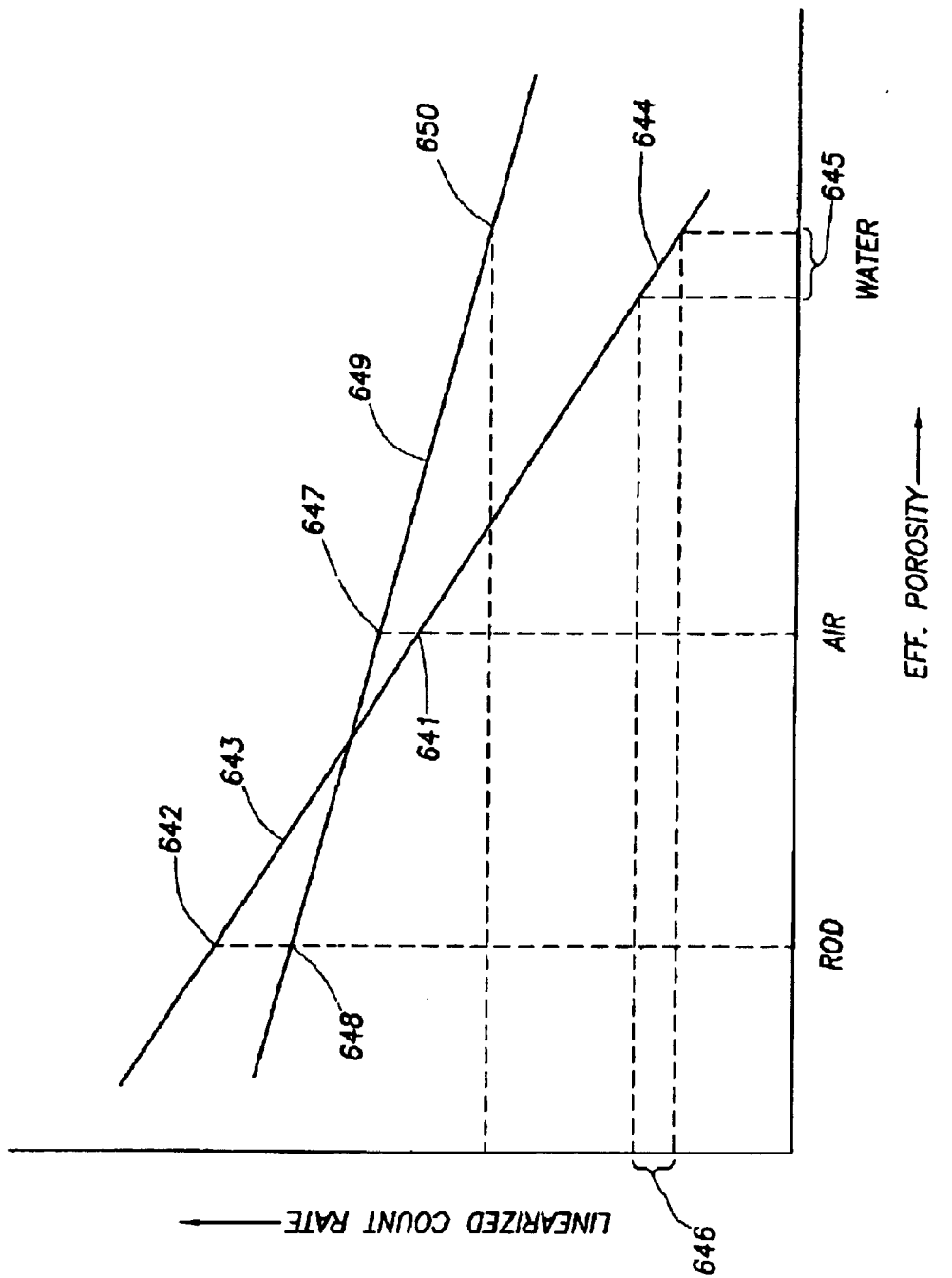
FIG. 6C shows a plot of a neutron sensor response function and a quality-check point according to one embodiment of the invention.

FIG. 6C shows an embodiment of a two-point calibration and quality-check method applied to a neutron sensor. The first neutron sensor response, plotted at 641, is made using air as the first calibration substance, and the second neutron sensor response, plotted at 642, is measured using a polymer rod as the second calibration substance. A neutron sensor response function is determined from the first 641 and second 642 neutron sensor responses. Such a response function is represented by line 643. An expected range, shown at 646, is determined from an allowable error in the porosity measurement 645. A quality check response, shown at 644, is measured with water as the quality check substance.

An error in the calibration can result in a quality-check response that is not within the expected range. For example, if there is any water (or residual mud) in the mud channel of a neutron sensor during the measurement of the first neutron sensor response, the count rate will be too high. Point 647 shows an example of a high first neutron sensor response. A response function determined from the high first neutron sensor response, for example, plotted at line 649, would be inaccurate. A quality check response measured with water as the quality check substance would be predicted at point 650. If the quality check response instead was measured near point 644, the calibration would be invalid. The neutron sensor may be recalibrated.

Advantageously, a sensor that is calibrated with a two-point calibration method and quality-checked has a more accurate sensor response function and a high degree of confidence in the response function. The combination of the two-point calibration and the quality-check removes the differences between different sensors so one set of algorithms can be used to analyze data acquired with different sensors. It also removes the response changes over time within a particular tool, and it removes variations in source strength and center of activity.

For the purposes of this specification it will be clearly understood that the word "comprising" means "including but not limited to", and that the word "comprises" has a corresponding meaning.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calibrating a well-logging sensor adapted for disposal on a tool adapted for disposal in said well, comprising:

emitting a first signal into a first calibration substance internally disposed within a channel in said tool proximate to the sensor;

measuring a first sensor response from the first signal;

emitting a second signal into a second calibration substance internally disposed within said channel in said tool proximate to the sensor;

measuring a second sensor response from the second signal; and determining a sensor response function from the first sensor response and the second sensor response.

2. The method of claim 1, wherein the sensor response function is a linear function.

3. The method of claim 1, wherein the well-logging sensor is a neutron sensor.

4. The method of claim 3, wherein the neutron sensor is surrounded by water.

5. The method of claim 4, wherein one of the first calibration substance and the second calibration substance is air.

6. The method of claim 4, wherein one of the first calibration substance and the second calibration substance is a polymer rod having a known effective porosity.

7. A method for calibrating a well-logging sensor adapted for disposal on a tool adapted for disposal in said well, comprising:

emitting a first signal into a first calibration substance internally disposed within a channel in said tool proximate to the sensor;

measuring a first sensor response from the first signal;

emitting a second signal into a second calibration substance internally disposed within said channel in said tool proximate to the sensor;

measuring a second sensor response from the second signal; and emitting a third signal into a third calibration substance internally disposed within said channel in said tool proximate to the sensor;

measuring a third sensor response from the third signal; and determining a sensor response function from the first sensor response, the second sensor response, and the third sensor response.

8. A method for calibrating a well-logging neutron sensor adapted for disposal on a tool adapted for disposal in said well, comprising:

emitting a first neutron signal with air disposed in a channel within said tool proximate the sensor;

measuring a first neutron sensor response from the first neutron signal;

emitting a second neutron signal with a polymer rod disposed in said channel proximate the sensor;

measuring a second neutron sensor response based on the second neutron signal; and determining a neutron sensor response function from the first neutron sensor response and the second neutron sensor response.

9. The method claim 8, wherein the neutron sensor response function is linear.

10. A method for calibrating a well-logging neutron sensor adapted for disposal on a tool adapted for disposal in said well, comprising:

emitting a first neutron signal with air disposed in a channel within said tool proximate the sensor;

measuring a first neutron sensor response from the first neutron signal;

emitting a second neutron signal with a polymer rod disposed in said channel proximate the sensor;

measuring a second neutron sensor response based on the second neutron signal; and emitting a third neutron signal with water disposed in said channel proximate the sensor;

measuring a third neutron sensor response based on the third neutron signal; and determining a neutron sensor response function from the first neutron sensor response and the third neutron sensor response.

11. A method of calibrating a well-logging sensor adapted for disposal on a tool adapted for disposal in said well, comprising:

emitting a signal into each of at least two calibration substances internally disposed within a channel in said tool proximate to the sensor;

measuring at least two sensor responses corresponding to the signals emitted into said disposed calibration substances; and determining a sensor response function from the at least two sensor responses.

* * * * *